June 1, 1937.  G. H. SMITH ET AL  2,082,223
CONTROL VALVE FOR PRESSURE REGULATING AND REDUCING APPARATUS
Filed Jan. 31, 1933  2 Sheets-Sheet 1
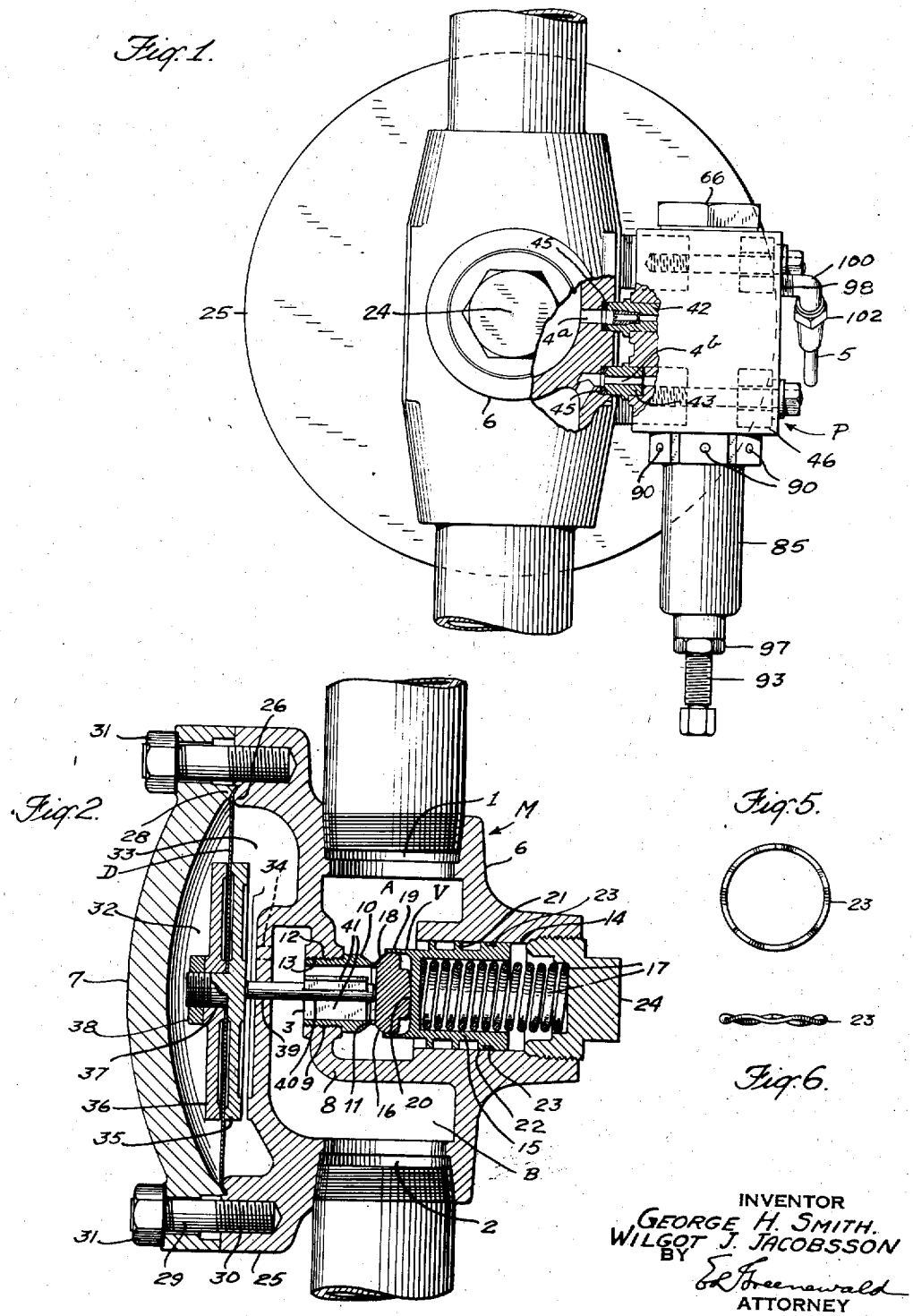
INVENTOR
GEORGE H. SMITH.
WILGOT J. JACOBSSON
BY
ATTORNEY June 1, 1937.                G. H. SMITH ET AL                2,082,223
           CONTROL VALVE FOR PRESSURE REGULATING AND REDUCING APPARATUS
                    Filed Jan. 31, 1933          2 Sheets-Sheet 2
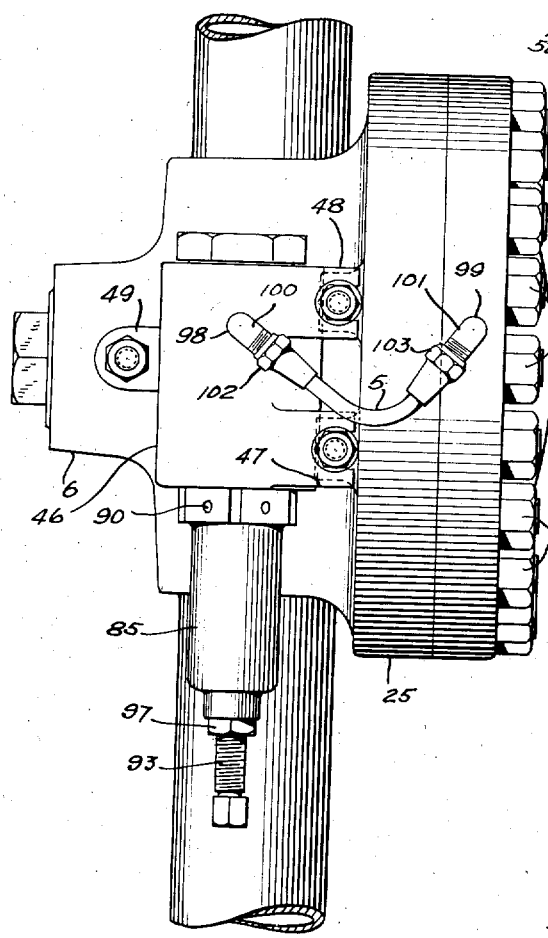
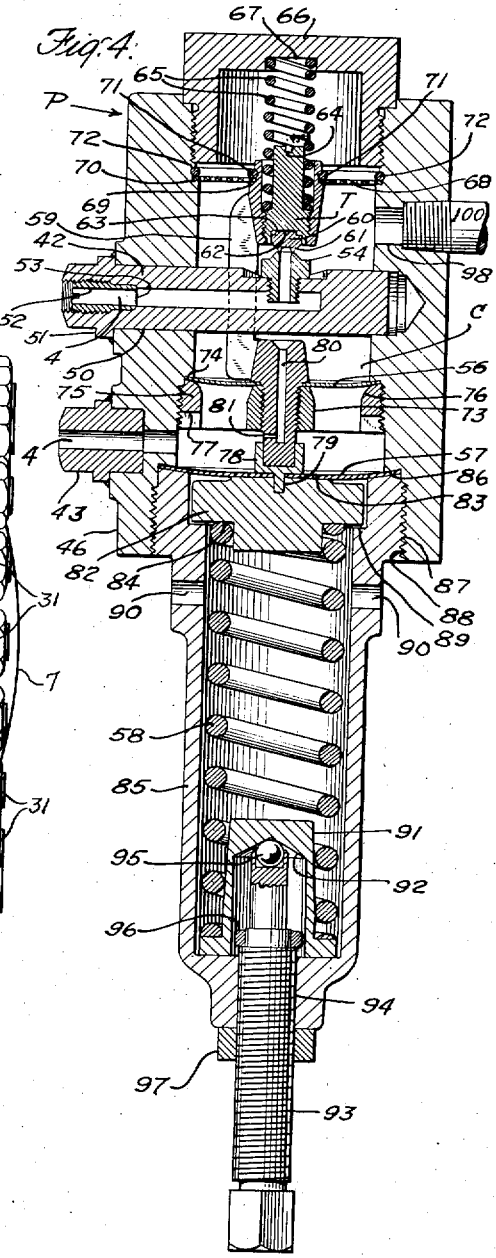
INVENTOR
GEORGE H. SMITH.
WILGOT J. JACOBSSON
BY
ATTORNEY Patented June 1, 1937

2,082,223

UNITED STATES PATENT OFFICE 2,082,223

CONTROL VALVE FOR PRESSURE REGULATING AND REDUCING APPARATUS

George H. Smith, Kenmore, and Wilgot J. Jacobsson, Buffalo, N. Y., assignors, by mesne assignments, to Union Carbide and Carbon Corporation, a corporation of New York Application January 31, 1933, Serial No. 654,380

16 Claims. (Cl. 251—31)

This invention relates to pressure regulating and reducing apparatus and more particularly relates to improvements in apparatus employing a pilot regulator to control the pressure delivered by a main regulator.

When regulating and reducing apparatus is employed in connection with an oxygen cylinder, the low temperature gas which is supplied from the cylinder prevents the proper operation of valves and diaphragms of rubber composition of the kind used in prior type regulators. The temperature of converted oxygen gas is considerably below —5° C., the point at which rubber loses its resiliency and tends to become "glassy" and brittle. It is necessary therefore to substitute for the rubber parts of the regulator some material that will be unaffected by extremely low temperatures.

Metal may be used in place of rubber in the valve seats and diaphragms in prior types of regulators, but a tight sealing effect in the valves cannot be accomplished in such regulators unless there is an exact alignment between the valve and the seat. Perfect axial alignment of the valve parts requires great accuracy of machine work and entails prohibitive costs of manufacture.

It is an object of this invention to provide in a pressure regulating and reducing apparatus all metal valve parts that will seal tightly without necessitating exact axial alignment.

The above and other objects together with the novel features of this invention will be apparent from the following description and the accompanying drawings, of which Fig. 1 is a full view of the apparatus with a section cut away disclosing the connecting nipples between the main regulator and the pilot regulator;

Fig. 2 is a cross section of the main regulator showing the valve construction;

Fig. 3 is a side view of the assembled apparatus;

Fig. 4 is an enlarged view showing a cross section of the pilot regulator; and

Figs. 5 and 6 are views showing the frictional ring which is employed to dampen the action of the main valve.

The regulating and reducing apparatus comprises a main regulator M and a pilot regulator P so interconnected that pressure delivered by the pilot regulator governs the main regulator. The main regulator has an inlet 1 and an outlet 2 connected by a port 3 which is controlled by a main valve V. The inlet 1 and the outlet 2 are also connected by a by-pass 4 leading through the pilot regulator and controlled by a pilot valve T. The control pressure delivered by the pilot regulator is directed through a passageway or tubing 5 to a main valve operating diaphragm D.

The main regulator M may comprise a body 6 and a cover 7. A partition 8 in the body separates an inlet chamber A from an outlet chamber B and has a central opening 9 for receiving a nozzle 10. The nozzle is provided with a large diameter bore or port 3 and with a hexagonal shoulder having a raised sealing surface or valve seat 11. The nozzle may be threadedly secured within the opening 9 by cooperating screw threads 12 and 13. A bore 14 may be made in the wall of the body 6 in alignment with the nozzle 10 for guiding a valve head retainer 15, valve head 16 and closing spring 17.

In accordance with this invention the valve head 16 comprises a relatively thick metal disc having a raised annular sealing area or face 18 of substantially the same diameter and width as the valve seat 11. The edge of the valve head 16 has a convex curvature. It fits within a recess in a cage 19 having a concave curvature which receives the convex curvature on the valve head 16 and which forms a part of the valve head retainer 15. The side of the valve head 16 opposed to the valve face has a raised central portion that is provided with a convex surface 20 bearing against a flat area of the valve head retainer 15. Valve head 16 is therefore slightly rockable within the retaining cage 19 so that the annular valve face 18 and valve seat 11 may be brought into uniform contact even though the plane of the valve face and the plane of the valve seat may not have been parallel with each other when the valve was assembled.

The valve head retainer 15 may have a number of spaced annular ribs 21 for reducing the friction between the wall of the bore 14 and the retainer when the retainer is moved by the spring 17 in opening and closing the main port. The ribs act to make the bore self-cleaning. Near the outer end of the retainer a groove 22 is made for receiving an annular friction ring 23. The ring 23 is bent sinusoidally at several points in the circumference without altering its annular shape but so as to fit tightly within the groove. The ring bears longitudinally against the opposed side walls of the groove, and bears radially against the walls of the bore 14. The ring slides frictionally in the bore 14 and is free to rotate about the seat retainer, producing a substantially constant amount of friction to prevent chattering of the main valve. A suitable cap 24 may be provided to close off the outer end of the bore 14. A recess in the under side of the cap and another recess in the valve head retainer receive and support the opposite ends of the compression spring 17. The spring 17 is comparatively weak in order that the effect of spring pressure on the action of the main valve may be reduced.

The main regulator body 6 is provided with an annular rim 25 having its center axis in alignment with the nozzle 10 and the bore 14. A cover, as a curved cover 7, may be mounted on the rim 25 and clinch the outer edge of the main operating diaphragm D between a rounded lip 26 on the rim and a cooperating annular edge 28 on the under side of the cover. When so positioned, suitable stud bolts 29 may be screwed into tapped drillings 30 in the rim 25 and nuts 31 may be employed to bring the body and cover tightly together. The diaphragm D forms a chamber 32 under the cover and a space 33 between the body 6 and the diaphragm. The latter space 33 is connected with the outlet chamber B by a port 34 so that delivery pressure may act against the diaphragm D. The diaphragm is supported against excessive flexing by plates 35 and 36 which are joined together by means of a stud 37, forming an integral part of the plate 35, and by a nut 38. Each of the plates has a central hub. Between these hubs the diaphragm D is clamped when the nut 38 is tightened on the stud 37. A raised annular lip on the outer edge of each plate acts as a partial stop to the flexing action of the diaphragm when under pressure.

A drilling 39 is made in the wall of the body between chamber B and space 33 and in alignment with the valve port 3. A floating valve stem 40 slides within the drilling 39 without appreciable friction and extends from the base of plate 35 to the valve head 16. When the valve V is closed, the stem 40 bears lightly against the diaphragm supporting plate, and the diaphragm D maintains a normal flat position. A number of rectangular vanes 41 may be welded to the stem 40 where it passes through the nozzle or port 3 in order to align the stem centrally against the valve head 16. The guiding vanes slide against the wall of the port 3 and move with little or no friction when the valve is operated.

As shown in Fig. 1 an opening 4a is made in the wall of inlet chamber A for communicating with the pilot regulator P, and an opening 4b is made in the wall of outlet chamber B for completing the by-pass 4 around the main valve V from the inlet chamber A to the delivery chamber B through the pilot regulator. The openings 4a and 4b are counterbored so as to receive one end of the beveled nipples 42 and 43. A suitable packing material 45 is provided in the counterbores and is compressed by the beveled ends of the nipples to form gas-tight joints when the regulators are assembled. The other ends of the nipples 42 and 43 are connected to the pilot regulator P.

The pilot regulator P as shown in Fig. 4 comprises a body 46 preferably cylindrical in shape and provided with lugs 47, 48 and 49 for attaching the body 46 to the main regulator body 6 with stud bolts and nuts. The inlet nipple 42 extends through a drilling 50 in the body adjacent the main regulator and is supported at the closed end by a recess in the opposing wall. The bore of the inlet nipple provides an inlet chamber for the pilot regulator. A flange 51 on the nipple forms a shoulder which is welded or otherwise secured to the pilot regulator body. The by-pass passage 4 in the nipple is tapped at the inlet end to receive a screen retainer 52 and a fine mesh wire screen 53 for removing foreign particles from the gas. A small nozzle 54 is screwed into a tapped drilling in the upper side of the nipple to provide a communication between the passage in the nipple and the pilot delivery chamber C.

The pilot regulator comprises also a valve mechanism operated by a pilot diaphragm 56, and a pressure responsive mechanism operated by a secondary diaphragm 57 and an adjustable spring 58. The pilot valve mechanism and the pressure responsive mechanism are interconnected by a yoke 59 so that movements of the secondary diaphragm 57 and the adjustable spring 58 also operate the pilot valve.

The pilot valve mechanism may comprise a valve head 60 having a raised sealing area or valve face 61 and a convex base 62 as on the main valve head 16. The valve face 61 co-operates with a valve seat on the nozzle 54 when the pilot valve is closed. A valve retaining member T provided with a concave recess 63 holds the valve head rockably positioned so that the valve head may adjust itself and make full contact with the nozzle although not in exact alignment as in the case of the main valve V. A threaded area on the retaining member T is screwed into a cylindrical portion of the yoke 59 by means of an upwardly extending stem provided with a screw slot 64. A light valve closing spring 65 is supported between the stem and cylindrical wall of the yoke and is compressed against a suitable cap 66 having a shallow drilling 67 for holding the end of the spring.

The yoke 59 is kept in a central position in the pilot regulator by an annular perforated diaphragm 68 fitting around the upper end of the yoke and resting against a shoulder 69 thereof and a corresponding shoulder 70 in the body 46. Spring wire retaining rings 71 and 72 respectively support the diaphragm 68 against the inner and outer shoulders. The yoke is shaped so as to pass around the nipple 42 and have its upper end and its lower end centrally aligned within the pilot regulator. The lower end of the yoke supports the pilot diaphragm 56 by means of a cooperating nut 73. The outer edge of the pilot diaphragm is supported against a slightly beveled shoulder 74 in the body by nut 75. The clamping ring may be externally threaded to cooperate with an internally threaded portion below the shoulder 74 in the body 46, and may be provided with a curved area 76 contacting the under side of the pilot diaphragm and forcing the outer edge thereof against the beveled shoulder 74 in the body. When so clamped the outer edge of the diaphragm will bend readily under pressure exerted from above. Diametrically opposed slots 77 are made in the clamping ring in order to screw the same into place. The end of the yoke rests within a close fitting, cup-shaped washer 78 having a stem 79. A chamber C is made in the upper part of the pilot regulator by the pilot diaphragm, and in order to complete the by-pass from nipple 42 to nipple 43 in axial drilling 80 is made in the lower end of the yoke and a small bleeder passage 81 is drilled radially in the side of the yoke below the nut 73.

The secondary or pressure-responsive diaphragm 57 is supported at the center by the stem 79 of washer 78 and by a guiding member 82. The guiding member 82 has a shallow hole in the center for receiving the stem 79, and a raised upper area 83 which bears against a substantial part of diaphragm 57. The under side of guiding member 82 may be provided with a shoulder 84 resting on the upper end of the adjustable spring 58. A cap 85 encloses the spring 58 and bears against a beveled shoulder 86 in the body when threadedly connected by screw threads 87 and 88. The annular end of the cap is similarly beveled and clamps the outer edge of diaphragm 57 against the shoulder 86 so that the diaphragm tends to bend downward when the valve is in a closed position. The wall of the cap 85 is of greater width than the shoulder 86 and supports an additional area on the under side of the diaphragm. The unsupported area of the secondary diaphragm 57 is slightly greater than that of the pilot diaphragm 56, allowing fluctuations of pressure in the space between the two diaphragms to have a greater effect on the secondary diaphragm than on the pilot diaphragm 56.

The cap 85 may have a shoulder 89 extending under the outer edge of the guiding member 82 and acting as a stop to hold the member in place against the end of the yoke when not under pressure of the adjusting spring 58. The cap is preferably provided with a number of breather ports 90 which admit atmospheric pressure to the under side of diaphragm 57. The spring may be a relative strong helical coil of spring wire compressed between the guiding member and a spring adjusting washer 91. In order to vary the compression of spring 58, the spring adjusting washer has a shoulder bearing against the end of the spring and an inner cylindrical bore provided with a chamfered base 92 against which a threaded stem 93 may be screwed. The stem 93 cooperates with a drilled and tapped opening 94 in the end of the cap and has a convenient nut at the outer end for adjusting the position of the stem and the spring. The end of the stem bearing against the washer 91 is machined to form a socket for holding a ball bearing 95 that reduces friction at this point. A ring washer 96 is secured to the stem near the upper end in order to prevent the stem from being screwed out of the cap when the spring is decompressed. A suitable lock nut 97 may be employed to maintain any desired setting of the adjustable spring and stem.

The main chamber C in the pilot regulator is connected with the chamber 32 between the cover and the main diaphragm D in the main regulator so that pressure delivered by the pilot valve may act on the main diaphragm D. A drilling 98 is made in the side of chamber C and a drilling 99 is made in the side of the cover 7, which drillings are tapped to receive elbows or nipples 100 and 101 that may be interconnected by a tube 5. Suitable flaring nipples may be welded to either end of the tube, and union fittings 102 and 103 may be employed in completing the connection.

The valve heads and nozzles in both regulators are preferably made of a nitrided ferrous alloy that provides sealing surfaces of hard wearing, non-corrodible or corrosion-resistant metal. The valve face and the valve seat are ground to optical flats to insure a complete line of contact between the valve face and the seat at all points around the face and the seat. It is also preferred to use a flexible sheet of a suitable non-corrodible (corrosion-resistant) metal or alloy such as "Everdur" for the diaphragms.

In constructing the valve parts the ratio between the area within the seal or line of contact between the valve face and its seat and the area of the active portion of the diaphragm in each regulator is made substantially equal. The active area of the diaphragms relates to the area affected by pressure. The main and pilot valves are constructed to open in opposite directions in respect to the flow of the fluid therethrough. When the main regulator and the pilot regulator valves are so constructed and are proportioned in respect to their diaphragms as stated, the pressure delivered by the pilot valve to operate the main valve will compensate for the effects of changes in inlet pressure, and the main regulator will deliver a substantially constant pressure. In the preferred form of apparatus, as shown, the pilot valve is constructed to open with inlet pressure so that the delivery pressure in the pilot chamber falls with a falling inlet pressure. This characteristic is herein called a falling discharge characteristic. The main valve is constructed to open against inlet pressure so that a falling inlet pressure on the main valve tends to increase the main delivery pressure. This tendency is called a rising discharge characteristic. The effect of the falling characteristic of the pressure delivered to the main operating diaphragm chamber 32 by the pilot regulator counteracts the rising discharge tendency of the main valve and causes the apparatus to develop a substantially constant discharge characteristic, or constant delivery pressure regardless of a falling inlet pressure.

The pressure-responsive mechanism including the secondary diaphragm 57 reacts to changes in the flow of gas in the outlet chamber B of the main regulator. These changes, which are momentary pressure variations, are communicated to the diaphragm 57 and immediately adjust the position of the pilot regulator valve so that the main regulator delivers a greater or smaller volume of gas without substantially affecting the outlet pressure.

Although we have described a preferred form of this invention it should be understood that changes may be made in the form as shown without departing from the scope of this invention as set forth in the appended claims.

We claim:
1. A fluid control valve comprising a body having an inlet and an outlet; a partition within the body and having a port connecting the inlet with the outlet; a valve seat surrounding said port and being provided with a narrow raised sealing surface; a rockable valve head having a valve face with a similar sealing surface adapted to contact with said valve seat sealing surface and having a convex area on its rear surface; resilient means for continuously urging the said valve head toward the valve seat; and means including a cage having a portion cooperating with the convex area on the rear surface of said valve head and adapted for supporting said valve head at its outer peripheral margin and for rockably adjusting the said head to align the sealing surface of the valve face with said valve seat sealing surface.

2. A fluid control valve comprising a body having an inlet and an outlet; a partition within the body having a port connecting the inlet and the outlet; a nozzle secured within the port and having a raised valve seat; a valve head provided with a valve face having a similarly raised sealing surface adapted to contact with the valve seat on the nozzle, said valve head having a convex area on the side opposite the valve face sealing surface; a movable guide member having annular ribs thereon slidable in the valve body, the said member being adapted for guiding said valve head toward and away from the said nozzle; said guide member including a cage whereby the valve head is secured at its outer peripheral margin for a limited rocking adjustment with respect to the valve seat.

3. A fluid control valve comprising a body having an inlet and an outlet; a partition within the body between the inlet and the outlet and having a port therethrough adapted to connect the inlet with the outlet; a valve seat having a fixed narrow raised sealing surface of hard metal surrounding said port; a rockable valve head having a narrow raised sealing surface of hard metal adapted to contact with said valve seat sealing surface; a valve head retaining member for rockably supporting and adjusting said valve head to align said valve face sealing surface with said valve seat sealing surface; and a stem adapted for transmitting movement of a pressure-responsive means to said valve head, the head contacting directly with and being rockable independently of the stem.

4. A fluid control valve comprising a body having a partition provided with a valve port; a valve seat surrounding said port, having a raised sealing surface; a rockable valve head having a similar sealing surface adapted to contact with said valve seat surface, said valve head having a convex base; means slidably connected with said body and in approximate alignment with said nozzle; means attached to said slidable means for supporting said valve head whereby said valve head may be rockably self-adjusted for full line contact between the sealing surfaces when the valve port is closed; a stem adapted for transmitting movement of a fluid pressure responsive means to said valve head; and means for guiding the stem in the valve port.

5. A fluid control valve comprising a body having a partition provided with a valve port; a valve seat member having a sealing surface of hard metal surrounding said port; a valve head having a sealing surface of hard metal adapted to contact with said valve seat-sealing surface; a bore within said body in alignment with said valve seat member; spring-pressed slidable means including a cylinder within said bore for supporting said valve head; said cylinder having a groove in its outer peripheral wall, and having in its forward wall adjacent the valve head a recess provided with curved side walls for securing in the recess the said valve head at the peripheral margin thereof for limited rocking movement of the said head; and an annular ring bent sinusoidally to fit within said groove, said ring bearing against the wall of said bore for producing a substantially constant amount of friction.

6. In a pressure regulating and reducing apparatus, the combination of a body having a partition provided with a valve port and a bore in approximate alignment with said valve port; a nozzle secured in said partition and forming the walls of said port; a valve seat on said nozzle having a sealing surface surrounding said port; a valve head having a sealing surface adapted to contact with said valve seat sealing surface; a spring-pressed slidable means contacting the sides of said bore for rockably supporting said valve head; a floating valve stem arranged within the nozzle and bearing against the valve head and adapted to transmit to the latter the movement of a fluid-pressure responsive means, and means adapted to align the stem axially in the nozzle and to guide the end of the stem against the center of said valve head.

7. A fluid control valve comprising a body having an inlet and an outlet; a partition within the body between the inlet and the outlet; said partition having a port therethrough adapted to connect said inlet with said outlet; a valve seat member having a sealing surface surrounding said port; a valve head having a face provided with a sealing surface adapted to contact with said valve seat sealing surface; a bore within said body in alignment with said valve seat; a spring-pressed slidable cylinder within said bore for supporting said valve head, said cylinder having an annular groove in its external wall; and an annular resilient ring bent sinusoidally to fit within said groove, said ring bearing longitudinally against the opposed side walls of said groove and radially against said bore.

8. A fluid control valve comprising a body having an inlet and an outlet; a partition within the body between the inlet and the outlet, said partition having a port therethrough adapted to connect said inlet with said outlet; a valve seat surrounding said port; a valve head having a face adapted to contact with the valve seat; a bore within said body in alignment with said port; and a spring-pressed slidable cylinder within said bore for rockingly supporting said valve head, said cylinder having open annular grooves in its external surface facing the wall of said bore, the annular ribs formed by said grooves bearing frictionally against the bore.

9. In a pressure regulating and reducing apparatus the combination of a body having a partition provided with a valve port; a nozzle secured to said partition and forming the walls of said port; a valve seat on said nozzle having a raised sealing surface of hard metal surrounding said port; a valve head comprising a similar raised sealing surface of hard metal adapted to contact with said valve seat sealing surface; a bore within said body in approximate alignment with said nozzle; means including a spring-pressed cylindrical member within said bore for rockably supporting said valve head; a valve stem centrally guided within the nozzle and bearing against said valve head; a flexible diaphragm arranged within said body; and flex-limiting means for supporting said diaphragm from both sides over a substantial area at the center thereof and bearing against the valve stem.

10. In a pressure regulating and reducing apparatus the combination of a body having a partition provided with a valve port; a nozzle secured to said partition and forming the walls of said port; a valve seat on said nozzle comprising a raised sealing surface surrounding said port; a valve head having a similar raised sealing surface adapted to contact with said valve seat sealing surface; a bore within said body in approximate alignment with said nozzle; means including a spring-pressed cylindrical member within said bore for rockably supporting said valve head; a flexible diaphragm arranged within said body; a valve stem centrally guided within the nozzle and bearing against said valve head and diaphragm so as to permit freedom of relative rocking movement between said stem and said diaphragm and head respectively; and means for supporting said diaphragm over a substantial area at the center thereof and for limiting the flexing of the diaphragm at the said area.

11. A fluid control valve comprising a body having an inlet and an outlet; and means for forming a fluid-tight separation between said inlet and said outlet, said means comprising a wall, a port in said wall, a valve seat member surrounding said port and having a raised sealing surface, a rockable valve head having a valve face with a similar sealing surface adapted to contact with said valve seat sealing surface, means including a convex area on the rear of said valve head for supporting and rockably adjusting said valve head to align said valve face sealing surface with said valve seat sealing surface, means for urging the rockable valve head into contact with the valve seat, and means guided within the said port for applying force to the said rockable valve head opposing the last-named means.

12. A fluid control valve comprising a valve seat member having a sealing surface of hard corrosion-resistant metal, a valve head having a sealing surface of hard corrosion-resistant metal coacting with that of the said seat, the said sealing surfaces being finished to optical flats, the opposite surface of the valve head having a convex midportion, a valve head-housing member having therein a recess adapted to support the valve head for limited rocking movement of the latter at the said convex portion, and means including a spring for urging the valve head toward the valve seat.

13. A fluid control valve comprising a body having a partition provided with a valve port; a valve seat member having a metal sealing surface surrounding said port; a valve head having a metal sealing surface adapted to contact with said valve seat sealing surface; a bore within said body in alignment with said valve seat member; spring-pressed longitudinally slidable means including a cylinder within said bore for supporting said valve head at the outer peripheral margins of the latter; said cylinder having at least one annular rib and a groove in its external wall; and an annular ring bent sinusoidally to fit within said groove, said ring bearing uniformly against the wall of said bore for producing a substantially constant amount of friction.

14. A fluid control valve comprising a body having a partition provided with a valve port; a valve seat member having a metal sealing surface surrounding said port; a valve head having a metal sealing surface adapted to contact with said valve seat sealing surface; the said sealing surfaces being ground respectively to optical flats; a bore within said body in alignment with said valve seat member; spring-pressed slidable means including a cylinder within said bore for supporting said valve head; said cylinder having a groove in its external wall; and an annular ring bent sinusoidally to fit within said groove, said ring bearing uniformly against the wall of said bore for producing a substantially constant amount of friction.

15. A fluid control valve comprising a body having a partition provided with a valve port; a valve seat member having a sealing surface surrounding said port; a valve head having a sealing surface adapted to contact with said valve seat sealing surface, and having the opposite surface provided with a convex central portion; a bore within said body in alignment with said valve seat member; spring-pressed longitudinally slidable means including a hollow cylinder within said bore for supporting said valve head; said cylinder having a groove in its external wall; and sinusoidal dampening means for suppressing humming noise and disposed at the surfaces of contact of the said cylinder and the wall of said bore, and bearing uniformly against the wall of said bore for producing a substantially constant amount of friction; the said cylinder having an end thereof adapted to house the valve head and to support it at the peripheral margin and at the said convex central portion for limited rocking movement.

16. A fluid control valve comprising a body having a partition provided with a valve port; a valve seat member having a narrow metal sealing surface surrounding said port; a valve head having a narrow metal sealing surface, adapted to contact with said valve seat-sealing surface; a bore within said body in alignment with said valve seat member; and spring-pressed longitudinally-movable means including a cylinder within said bore for supporting said valve head; said cylinder having an annular groove in its outer peripheral wall, and having in its forward wall adjacent the valve head a recess provided with curved side walls adapted for securing in the said recess the said valve head at the peripheral margin of the latter for limited locking movement of the said head.

GEORGE H. SMITH.
WILGOT J. JACOBSSON.

CERTIFICATE OF CORRECTION.

Patent No. 2,082,223.   June 1, 1937.

GEORGE H. SMITH, ET AL.

It is hereby certified that error appears in the printed specification of the above numbered patent requiring correction as follows: Page 2, second column, line 50, for the word "nut" read a clamping ring; line 66, for "in" read an; and that the said Letters Patent should be read with these corrections therein that the same may conform to the record of the case in the Patent Office.

Signed and sealed this 20th day of July, A. D. 1937.

Henry Van Arsdale (Seal)   Acting Commissioner of Patents.

wall, a port in said wall, a valve seat member surrounding said port and having a raised sealing surface, a rockable valve head having a valve face with a similar sealing surface adapted to contact with said valve seat sealing surface, means including a convex area on the rear of said valve head for supporting and rockably adjusting said valve head to align said valve face sealing surface with said valve seat sealing surface, means for urging the rockable valve head into contact with the valve seat, and means guided within the said port for applying force to the said rockable valve head opposing the last-named means.

12. A fluid control valve comprising a valve seat member having a sealing surface of hard corrosion-resistant metal, a valve head having a sealing surface of hard corrosion-resistant metal coacting with that of the said seat, the said sealing surfaces being finished to optical flats, the opposite surface of the valve head having a convex midportion, a valve head-housing member having therein a recess adapted to support the valve head for limited rocking movement of the latter at the said convex portion, and means including a spring for urging the valve head toward the valve seat.

13. A fluid control valve comprising a body having a partition provided with a valve port; a valve seat member having a metal sealing surface surrounding said port; a valve head having a metal sealing surface adapted to contact with said valve seat sealing surface; a bore within said body in alignment with said valve seat member; spring-pressed longitudinally slidable means including a cylinder within said bore for supporting said valve head at the outer peripheral margins of the latter; said cylinder having at least one annular rib and a groove in its external wall; and an annular ring bent sinusoidally to fit within said groove, said ring bearing uniformly against the wall of said bore for producing a substantially constant amount of friction.

14. A fluid control valve comprising a body having a partition provided with a valve port; a valve seat member having a metal sealing surface surrounding said port; a valve head having a metal sealing surface adapted to contact with said valve seat sealing surface; the said sealing surfaces being ground respectively to optical flats; a bore within said body in alignment with said valve seat member; spring-pressed slidable means including a cylinder within said bore for supporting said valve head; said cylinder having a groove in its external wall; and an annular ring bent sinusoidally to fit within said groove, said ring bearing uniformly against the wall of said bore for producing a substantially constant amount of friction.

15. A fluid control valve comprising a body having a partition provided with a valve port; a valve seat member having a sealing surface surrounding said port; a valve head having a sealing surface adapted to contact with said valve seat sealing surface, and having the opposite surface provided with a convex central portion; a bore within said body in alignment with said valve seat member; spring-pressed longitudinally slidable means including a hollow cylinder within said bore for supporting said valve head; said cylinder having a groove in its external wall; and sinusoidal dampening means for suppressing humming noise and disposed at the surfaces of contact of the said cylinder and the wall of said bore, and bearing uniformly against the wall of said bore for producing a substantially constant amount of friction; the said cylinder having an end thereof adapted to house the valve head and to support it at the peripheral margin and at the said convex central portion for limited rocking movement.

16. A fluid control valve comprising a body having a partition provided with a valve port; a valve seat member having a narrow metal sealing surface surrounding said port; a valve head having a narrow metal sealing surface, adapted to contact with said valve seat-sealing surface; a bore within said body in alignment with said valve seat member; and spring-pressed longitudinally-movable means including a cylinder within said bore for supporting said valve head; said cylinder having an annular groove in its outer peripheral wall, and having in its forward wall adjacent the valve head a recess provided with curved side walls adapted for securing in the said recess the said valve head at the peripheral margin of the latter for limited locking movement of the said head.

GEORGE H. SMITH.
WILGOT J. JACOBSSON.

CERTIFICATE OF CORRECTION.

Patent No. 2,082,223. June 1, 1937.

GEORGE H. SMITH, ET AL.

It is hereby certified that error appears in the printed specification of the above numbered patent requiring correction as follows: Page 2, second column, line 50, for the word "nut" read a clamping ring; line 66, for "in" read an; and that the said Letters Patent should be read with these corrections therein that the same may conform to the record of the case in the Patent Office.

Signed and sealed this 20th day of July, A. D. 1937.

Henry Van Arsdale (Seal) Acting Commissioner of Patents.

CERTIFICATE OF CORRECTION.

Patent No. 2,082,223.

June 1, 1937.

GEORGE H. SMITH, ET AL.

It is hereby certified that error appears in the printed specification of the above numbered patent requiring correction as follows: Page 2, second column, line 50, for the word "nut" read a clamping ring; line 66, for "in" read an; and that the said Letters Patent should be read with these corrections therein that the same may conform to the record of the case in the Patent Office.

Signed and sealed this 20th day of July, A. D. 1937.

Henry Van Arsdale

Acting Commissioner of Patents.

(Seal)